Dec. 27, 1932.    S. B. HEATH    1,892,652

PREPARATION OF STRONG HYDROGEN HALIDE GAS

Filed Oct. 4, 1929

Liquid Vapor Composition Curves for Aqueous Hydrochloric Acid Solutions at Boiling Point.

INVENTOR

BY Sheldon B. Heath
Thomas Griswold, Jr.
ATTORNEY

Patented Dec. 27, 1932

1,892,652

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

PREPARATION OF STRONG HYDROGEN HALIDE GAS

Application filed October 4, 1929. Serial No. 397,256.

This invention relates to methods for the preparation of a strong hydrogen halide gas by distilling an aqueous solution of such hydrogen halide, and particularly to the preparation of a strong hydrochloric acid gas.

The distillation of such aqueous acid solutions has heretofore been attended with serious practical difficulties, due to the extremely corrosive action thereof upon all of the common structural metals. The choice of structural materials for the distillation apparatus has accordingly been limited to a narrow range of acid-resisting materials which are mechanically weak, easily breakable and have a low conductivity for heat.

It is an object of my invention to provide a method for distilling the above-mentioned aqueous acids which utilizes primarily the latent heat of a vapor condensable at the distillation temperature which is brought into direct contact with the aqueous acid during the distillation, the medium employed being immiscible in the liquid phase with the aqueous liquid. Such procedure eliminates altogether the necessity for transmitting heat through a wall or partition of poorly heat-conducting material. Another object is to provide a method of distillation which may be carried out in relatively large size apparatus that is more strongly constructed and less easily destructible than the types of apparatus heretofore employed for similar purposes. Other objects and advantages will become apparent as the description proceeds.

To the accomplishment of the foregoing and related ends the invention, then, consists of the steps and means hereinafter fully described and particularly pointed out in the claims, the annexed drawing and following description setting forth in detail certain means and one mode of carrying out the invention, such disclosed means and mode illustrating, however, but a few of the various ways in which the principle of the invention may be used.

In said annexed drawing:—

Figure 2:
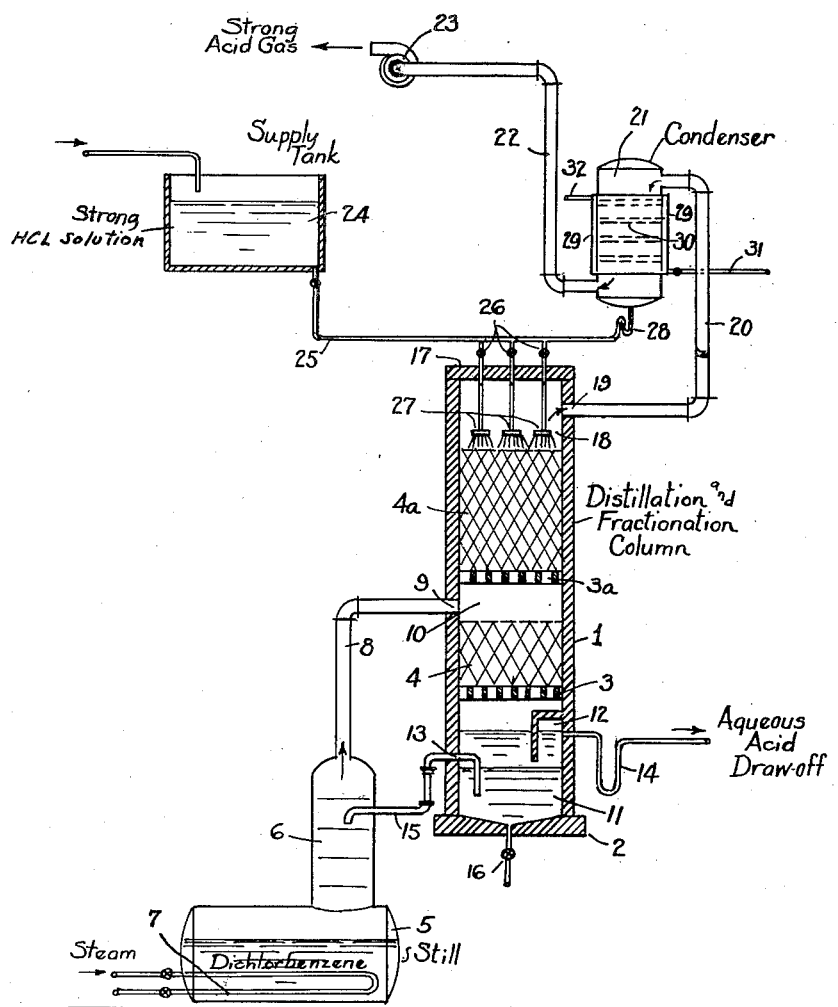
Figure 1:
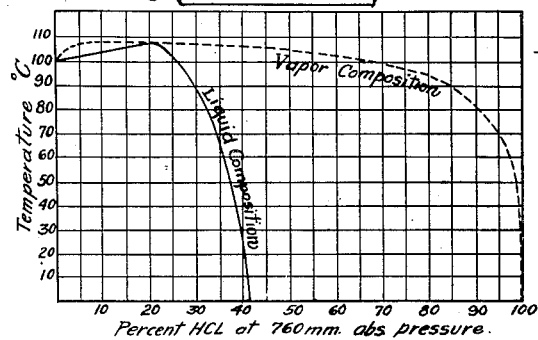

Fig. 1 is a chart showing liquid and vapor composition curves for boiling solutions of hydrochloric acid in water at normal atmospheric pressure, 760 mm. Fig. 2 is a diagrammatic representation in vertical cross-section of an apparatus adapted to carrying out my improved method.

In Fig. 1 the solid line curve represents the composition of boiling aqueous solutions of hydrochloric acid plotted against temperatures, and the broken line curve represents the composition of the vapor in equilibrium therewith. A common maximum point for both curves is found at a temperature of 108° C. and a composition of 20.2 per cent HCl, corresponding to a constant boiling point mixture. The solid line curve also constitutes a boiling point temperature curve for aqueous hydrochloric acid solutions in equilibrium with the saturated vapor thereof at normal atmospheric pressure. When an aqueous hydrochloric acid solution of greater strength than the constant boiling point mixture is distilled under fractionating conditions a more or less complete separation of acid gas and water may be secured depending upon the temperature maintained in the vapor space at the top of the fractionating column. Referring to the broken line curve, it will be seen that, if the temperature of the exit vapors from the distillation is controlled at a point not exceeding 70° C., the strength of the hydrochloric acid gas obtained will be 95 per cent. or more.

In the method of the present invention the heat required for the distillation is supplied by the hot vapors from a boiling organic liquid immiscible with and having a boiling point above that of the aqueous acid solution, such vapors being contacted directly with the acid solution in a distilling column. The vapors are thereby condensed, giving up their latent heat to the acid solution. By properly adjusting the rate of distillation of the organic liquid to the rate of feed of the aqueous acid solution, the latter may be distilled by exchange of heat with the condensing vapors of the organic compound. When the distillation is carried out in a suitable column under fractionating conditions a strong acid gas, e. g. 95 per cent or more, may be prepared by regulating the rate of distillation so as to maintain a temperature at the top of the column corresponding to a saturated acid vapor of such strength. The condensed organic liquid, together with the residual aqueous acid solution, flows to the base of the column, which should be so constructed as to provide a reservoir of sufficient capacity wherein the two liquids may separate in distinct layers and may then be drawn off separately. The organic liquid is then most advantageously to be returned to the body of boiling liquid which supplies the vapors to the distilling column, such liquid thus being continuously circulated during the operation of the process.

Referring to Fig. 2, column 1 constructed of suitable acid resisting material, such as sandstone, granite, carbon, etc., is supported upon a base slab 2 and on the inside thereof is provided with gratings 3 and 3a which carry two bodies of acid-proof packing material 4 and 4a. A still 5 and column 6, the former provided with a steam coil 7 or other heating means, is connected by means of vapor pipe 8 with inlet 9 to vapor space 10 constituting an intermediate section of column 1 between the upper and lower bodies of packing 4a and 4. Below grating 3 is reservoir 11 in which are disposed trapped outlets 12 and 13, the one located at a higher level than the other. From outlet 12 a trapped overflow pipe 14 leads to a collecting tank for spent aqueous acid not shown, while from outlet 13 a return pipe 15 leads to an intermediate section of column 6. A draw-off 16 is provided for draining reservoir 11.

Column 1 is closed by a top plate 17 enclosing an upper vapor space 18 whence outlet 19 for exit gases and pipe 20 lead to condenser 21 which in turn is connected by means of pipe 22 with exhaust fan 23. A supply tank 24 for strong aqueous acid solution is connected by a header pipe 25 and laterals 26 with upper vapor space 18, laterals 26 projecting through top plate 17 and carrying at the lower ends thereof spray nozzles 27 or the equivalent for distributing aqueous acid over the surface of packing 4. A trapped return pipe 28 from condenser 21 connects with header 25. Condenser 21 is shown as consisting of an enclosed tank provided with headers 29 on either side into which tubes 30 are sealed, while an inlet 31 and outlet 32 are provided for admitting a cooling liquid to be circulated through headers 29 and tubes 30. Any other suitable type of condenser, however, may be employed.

In operation, the organic liquid of suitable boiling point above that of the aqueous acid solution, e. g. hydrochloric acid, which is to be distilled, is boiled in still 5, the vapors thereof rising through column 6 and being conducted through pipe 8 to vapor inlet 9 of column 1. From tank 24 aqueous hydrochloric acid solution, having a strength in excess of the constant boiling point mixture, is introduced into the upper part of column, being distributed over the packing 4 by means of nozzles 27, and flows downwardly through the body of packing 4a in contact with the ascending vapors of the organic liquid. An exchange of heat occurs between the latter and the former whereby such vapors are condensed and the aqueous acid solution is distilled under fractionating conditions. By suitable regulation of the rate of supply of the vapors of the organic compound and of aqueous acid the excess hydrochloric acid content of the latter may be distilled off as a strong gas passing out through outlet 19. The condensed organic liquid is partially cooled in flowing through packing 4 to about the temperature of the constant boiling point acid solution, and together with a residual solution of about such composition is collected in reservoir 11. Here the two liquids are stratified or separated on standing into two distinct levers, of which the lower layer, as shown in the drawing, is the organic liquid and the upper layer an aqueous acid solution of approximately constant boiling point composition. However, if an organic liquid having a lower specific gravity than that of the constant boiling point acid solution is employed, naturally the position of the two layers will be reversed, and the location of the outlets 12 and 13, respectively, in such case is to be accommodated thereto, permitting the simultaneous withdrawal of both liquid layers. As the two layers accumulate they overflow through the trapped outlets 12 and 13, respectively. The spent aqueous acid solution overflowing from outlet 12 through pipe 14 may be further cooled and conveyed to a suitable collecting tank therefor, the further utilization thereof not being a part of this invention. The overflow of organic liquid, which may contain a small amount of aqueous acid impurity entrained or dissolved therein, is returned by pipe 15 to column 6 of still 5, preferably to an intermediate section of such column, wherein the aqueous acid content thereof is immediately flashed into vapor which is returned along with the organic vapors to column 1, while the organic liquid so returned flows back into still 5 to be there revaporized.

By properly regulating the operation of column 1 the vapor temperature in upper vapor space 18 thereof may be maintained at about 70° C. or below, so that the exit gases passing out through outlet 19 will consist of 95 per cent or more HCl, being at the same time saturated with the vapor of the organic compound. The exit gases may then be conducted to a cooler or condenser 21 wherein they are further lowered in temperature and the residual moisture content thereof largely condensed out as a saturated aqueous hydrochloric acid solution, along with a portion of the organic vapor content, which is returned to column 1 through pipe 28. The cooled gas passing out through pipe 22 will be substantially dry hydrochloric acid saturated with the vapor of the organic compound at the exit temperature. The removal of such organic vapor content, if desired, may be accomplished, for instance, by scrubbing the gases with concentrated sulphuric acid.

The organic compound to be employed as herein described must possess certain properties qualifying it for such use. Among the qualifications are: (1) that it have a boiling point above that of the maximum boiling point of any acid solution that is to be distilled, preferably sufficiently high so that a satisfactory heat head may be established between the organic vapors and the boiling acid solution; (2) that it be a liquid at ordinary temperatures or may be easily liquefied; (3) that it have a relatively low vapor pressure at the distillation temperature of the aqueous acid; (4) that it be insoluble in, unreactive with or undecomposed by contact with water or an aqueous acid; (5) that it have a specific gravity sufficiently higher or lower than that of the constant boiling point aqueous acid to permit easy separation therefrom as an immiscible layer; (6) that it be stable and capable of being repeatedly distilled without material oxidation or decomposition. Among the compounds possessing the above qualifications to a satisfactory degree may be mentioned diphenyl, diphenyl oxide, xylene and the mono- and di-halogenated derivatives of benzene or toluene and mixtures thereof.

Of particular utility is ortho-dichlorbenzene, which I have found best adapted to the operation of the herein described method. The latter compound is a liquid at ordinary temperatures but has a relatively high boiling point, e. g. 179° C. It is insoluble in all aqueous media and is very stable, being relatively unreactive, unaffected by contact with hot aqueous acid, and capable of being repeatedly distilled without material decomposition or oxidation. The usual commercial product containing a small percentage of para-dichlorbenzene, e. g. 5 to 10 per cent, is equally well adapted for use in my improved method.

By similar procedure aqueous solutions of hydrobromic acid may likewise be distilled, making due allowance in operation for the boiling point temperatures of such solutions. The constant boiling point solution contains 44 per cent HBr and boils at 126° C., consequently in operating with such solutions the maximum temperature of 126° C. would be attained in the distillation column.

The method herein described is not limited, however, to the preparation of a strong acid gas, but is capable of being applied to the distillation of aqueous hydrogen halide solutions of any strength. For instance, by suitably varying the rate of distillation and the composition of the acid solution supplied to the column, it may be adapted for distilling off an aqueous acid vapor mixture of any desired composition, as in purifying the feed solution from non-volatile impurities, or for concentrating a weak acid solution. When the acid solution supplied is more dilute than the constant boiling point mixture, it may be concentrated up to approximately the composition of such mixture by evaporating off water. On the other hand, stronger solutions than the constant boiling point mixture upon distillation give off vapors of greater acid content until the strength of the residual solution has been reduced to that of the constant boiling point mixture, after which continued boiling produces vapors of the composition of that mixture. Naturally, when the distillation is carried out for the purpose of concentrating a weak acid solution, or for distilling an aqueous acid solution from dissolved impurities, the condensed distillate will not be returned to the column as shown in the drawing, but will be separately collected or discarded, as the case may be, in any desired manner.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In a method of preparing a strong hydrogen halide gas of the class consisting of hydrogen bromide and hydrogen chloride, the step which consists in fractionally distilling an aqueous solution thereof having a concentration in excess of the constant boiling point mixture by contacting the same with the vapors of an organic compound at the boiling point of the latter, such compound being immiscible and unreactive with, and having a higher boiling point than, such aqueous acid.

2. In a method of preparing a strong hydrogen halide gas of the class consisting of hydrogen bromide and hydrogen chloride, the step which consists in fractionally distilling an aqueous solution thereof having a concentration in excess of the constant boiling point mixture by contacting the same with the vapors of ortho-dichlorbenzene at the boiling point of the latter.

3. In a method of preparing a strong hydrogen halide gas of the class consisting of hydrogen bromide and hydrogen chloride, the step which consists in causing a distributed stream of an aqueous solution thereof having a concentration in excess of the constant boiling point mixture to flow in direct heat exchange relation with the vapors of an organic compound at the boiling point of the latter, such compound being immiscible and unreactive with, and having a higher boiling point than, such aqueous acid.

4. In a method of preparing strong hydrochloric acid gas, the step which consists in fractionally distilling an aqueous solution thereof having a concentration in excess of the constant boiling point mixture by contacting the same with the vapors of an organic compound at the boiling point of the latter, such compound being immiscible and unreactive with, and having a higher boiling point than, such aqueous acid.

5. In a method of preparing strong hydrochloric acid gas, the step which consists in fractionally distilling an aqueous solution thereof having a concentration in excess of the constant boiling point mixture by contacting the same with the vapors of ortho-dichlorbenzene at the boiling point of the latter.

6. In a method of preparing strong hydrochloric acid gas, the step which consists in causing a distributed stream of an aqueous solution thereof having a concentration in excess of the constant boiling point mixture to flow in direct heat exchange relation with the vapors of an organic compound at the boiling point of the latter, such compound being immiscible and unreactive with, and having a higher boiling point than, such aqueous acid.

7. The method of preparing strong hydrochloric acid gas which comprises flowing a distributed stream of an aqueous solution thereof having a concentration in excess of the constant boiling point mixture in direct heat exchange contact with the vapors of an organic compound at the boiling point of the latter, such compound being immiscible and unreactive with, and having a higher boiling point than, such aqueous acid, whereby said excess of hydrochloric acid is liberated as gas and said vapors are condensed as liquid, while a residual aqueous acid solution of approximately constant boiling point composition flows from the distillation zone, collecting and separating such liquid and such aqueous solution, revaporizing the former and returning the vapors thereof to the distillation step.

8. The method of preparing strong hydrochloric acid gas which comprises flowing a distributed stream of an aqueous solution thereof having a concentration in excess of the constant boiling point mixture in direct heat exchange contact with the vapors of ortho-dichlorbenzene at the atmospheric boiling point thereof, whereby said excess of hydrochloric acid is liberated as gas and said vapors are condensed as liquid, while a residual aqueous acid solution of approximately constant boiling point composition flows from the distillation zone, collecting and separating such liquid and such aqueous solution, revaporizing the former and returning the vapors thereof to the distillation step.

9. In a method of the character described, the step which consists in distilling an aqueous solution of a hydrogen halide of the class consisting of hydrogen bromide and hydrogen chloride by contacting the same with the vapors of an organic compound at the boiling point of the latter, such compound being immiscible and unreactive with, and having a higher boiling point than, such aqueous acid.

10. In a method of the character described, the step which consists in distilling an aqueous hydrochloric acid solution by contacting the same with the vapors of an organic compound at the boiling point of the latter, such compound being immiscible and unreactive with, and having a higher boiling point than, such aqueous acid.

11. In a method of the character described, the step which consists in distilling an aqueous hydrochloric acid solution by contacting the same with the vapors of ortho-dichlorbenzene at the boiling point thereof.

Signed by me, this 1st day of October, 1929.

SHELDON B. HEATH.